US006658392B2

(12) United States Patent
Yoshida

(10) Patent No.: US 6,658,392 B2
(45) **Date of Patent: *Dec. 2, 2003**

(54) AUTOMATIC TOLL COLLECTION SYSTEM FOR AUTOMOTIVE VEHICLE

(75) Inventor: Ichiro Yoshida, Takahama (JP)

(73) Assignee: Denso Corporation, Kariya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/148,070

(22) Filed: Sep. 4, 1998

(65) Prior Publication Data

US 2002/0004741 A1 Jan. 10, 2002

(30) Foreign Application Priority Data

Sep. 5, 1997 (JP) ............................................ 9-241469

(51) Int. Cl.[7] ............................................... G06F 17/60
(52) U.S. Cl. .............................. 705/13; 705/1; 705/18; 701/29; 235/384
(58) Field of Search ............................... 705/13, 1, 18; 701/29; 235/384; 340/901, 902, 903, 904, 935, 937, 425.5, 438, 439, 500, 825.36, 825.49, 815.4, 999

(56) References Cited

U.S. PATENT DOCUMENTS 4,728,922 A * 3/1988 Christen et al. .............. 340/52
5,072,380 A * 12/1991 Randelman et al. .......... 705/13
5,086,389 A * 2/1992 Hassett et al. ................ 705/13
5,424,727 A * 6/1995 Shieh ......................... 340/928
5,680,328 A * 10/1997 Skorupski et al. ............ 701/35
5,719,771 A * 2/1998 Buck et al. ................. 455/456
5,760,709 A * 6/1998 Hayashi ...................... 340/923

(List continued on next page.)

FOREIGN PATENT DOCUMENTS

| | | | |
|---|---|---|---|
| JP | 49-98300 | | 9/1974 |
| JP | 9158871 | | 6/1997 |
| JP | 10194095 | * | 7/1998 |

OTHER PUBLICATIONS

Desmond, "Toll Booth Net Automates Fare Collection, Saves Cash", Network World, vol. V6, Issue n23, Jun. 1989.*
R. Sabounghi, "Intelligent Vehicle Highway System—The Universal Close Range Road/Vehicle Communication System Concept—the Enhanced AVI and Its CVO Applications", Vehicle Navigation & Information Systems Conference Proceedings, Part 2, pp. 957–967, Jun. 1989.*
Shin–Iuan Wang, 'An unified vehicle supervising and traffic information system, Seventh IEEE International Symposium on Personal, Indoor and Mobile Radio Communications', Part vol. 3, p 968–72, 1996.*
Davis, D.T., 'Remote monitoring of emissions using on–vehicle sensing and vehicle to roadside communications', Report No.: UCRL–JC–121155; CONF–950857–3, 8p, Jun. 1995.*

*Primary Examiner*—Tariq R. Hafiz
*Assistant Examiner*—Akiba Robinson-Boyce
(74) *Attorney, Agent, or Firm*—Harness, Dickey & Pierce, PLC

(57) ABSTRACT

An automatic toll collection system for automotive vehicles moving along a roadway is provided which includes a toll collecting facility and an inspecting facility. The toll collecting facility is installed in a toll booth on the roadway to collect the tolls from an in-vehicle unit through radio communication. The inspecting facility is provided outside the roadway and troubleshoots the in-vehicle unit when an abnormal condition in which it is impossible to collect the tolls from the in-vehicle unit correctly is encountered.

3 Claims, 14 Drawing Sheets

U.S. PATENT DOCUMENTS

| | | | | | |
|---|---|---|---|---|---|
| 5,777,565 | A | * | 7/1998 | Hayashi et al. | 340/928 |
| 5,805,082 | A | * | 9/1998 | Hassett | 340/928 |
| 5,819,234 | A | * | 10/1998 | Slavin et al. | 705/13 |
| 5,864,831 | A | * | 1/1999 | Schuessler | 705/417 |
| 5,872,525 | A | * | 2/1999 | Fukasawa et al. | 340/928 |
| 5,926,546 | A | * | 7/1999 | Maeda et al. | 380/9 |
| 5,955,970 | A | * | 9/1999 | Ando et al. | 340/928 |
| 5,974,397 | A | * | 10/1999 | Olsson et al. | 705/13 |
| 5,987,394 | A | * | 11/1999 | Takakura et al. | 702/123 |
| 6,006,146 | A | * | 12/1999 | Usui et al. | 701/29 |
| 6,009,403 | A | * | 12/1999 | Sato | 705/6 |
| 6,018,641 | A | * | 1/2000 | Tsubouchi et al. | 455/38.2 |
| 6,019,285 | A | * | 2/2000 | Isobe et al. | 235/384 |
| 6,025,776 | A | * | 2/2000 | Marsuura | 340/438 |
| 6,032,088 | A | * | 2/2000 | Feldmann et al. | 701/33 |
| 6,042,008 | A | * | 3/2000 | Ando et al. | 235/384 |

* cited by examiner

FIG. 5

LOW BATTERY LEVEL
EEPROM WRITE ERROR
EEPROM READ ERROR
ABSENCE OF IC CARD
CARD ERROR
IC CARD WRITE ERROR
IC CARD READ ERROR
DIAGNOSTIC ERROR OF IN-VEHICLE UNIT
UNAUTHORIZED CASE OPENING FLAG
⋮

AUTOMATIC TOLL COLLECTION SYSTEM FOR AUTOMOTIVE VEHICLE

BACKGROUND OF THE INVENTION

1. Technical Field of the Invention

The present invention relates generally to an automatic toll collection system designed to automatically collect tolls through radio communication between an electronic toll paying unit installed in a vehicle and a toll collecting unit installed in a toll booth on a roadway, and more particularly to a radio-based electronic toll collection system having a security monitor for monitoring abnormalities of an electronic toll paying unit and a toll collecting unit.

2. Background of Related Art

Japanese Patent First Publication No. 49-98300 teaches an automatic toll collection system designed to collect tolls from each vehicle moving along a toll road automatically through radio communication between an in-vehicle unit and a communication facility installed on the road. If such a system malfunctions, a large amount of time is required to troubleshoot the system, thus resulting in traffic congestion around a toll booth.

SUMMARY OF THE INVENTION

It is therefore a principal object of the present invention to avoid the disadvantages of the prior art.

It is another object of the present invention to provide an improved automatic toll collection system capable of troubleshooting an electronic toll paying unit installed in a vehicle and/or a toll collecting unit installed in a toll booth.

According to one aspect of the present invention, there is provided a system for automatic collection of tolls from a vehicle moving along a roadway which comprises: (a) a toll collecting facility installed on the roadway, the toll collecting facility collecting the tolls from an in-vehicle unit installed in the vehicle through radio communication with the in-vehicle unit; and (b) an inspecting facility inspecting the in-vehicle unit when an abnormal condition in which it is impossible to collect the tolls from the in-vehicle unit correctly is encountered, the inspecting facility being located outside the roadway.

In the preferred mode of the invention, the toll collecting facility determines whether the abnormal condition is encountered or not through radio communication with the in-vehicle unit.

A guidance unit is further provided which provides a guidance signal to the in-vehicle unit for leading the vehicle to the inspecting facility when the abnormal condition is encountered.

An image pickup sensor and a gate are further provided which are installed on an automatic toll collection lane mounted on the roadway. When a driver of the vehicle takes action to open the gate, the image pickup sensor picks up an image of the vehicle and the driver.

The inspecting facility includes a testing unit which locate an abnormality of the in-vehicle unit through radio communication therebetween.

The inspecting facility compares a result of inspection of the in-vehicle unit with determination of whether the abnormal condition is encountered or not made by the toll collecting facility to determine whether the abnormal condition is caused by the in-vehicle unit or the toll collecting facility.

A means is further provided which determines whether the abnormal condition is encountered or not prior to communication between the in-vehicle unit and the toll collecting facility. When it is determined that the abnormal condition is encountered, the means leads the vehicle to the inspecting facility.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 5 is an illustration which shows status data indicating abnormalities of the in-vehicle unit of FIG. 3;

DESCRIPTION OF THE PREFERRED EMBODIMENT

Figure 1:
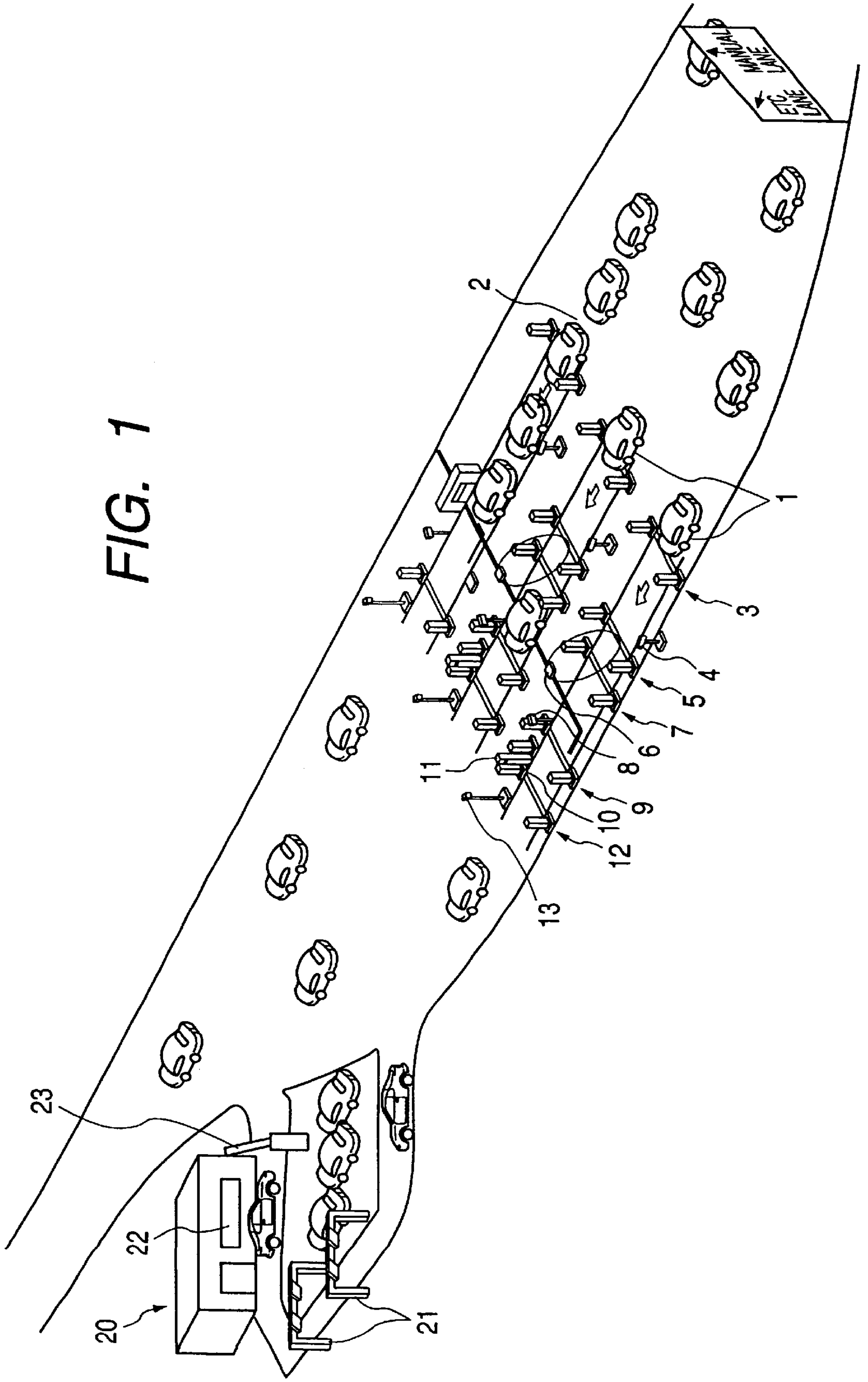
FIG. 1 is a perspective view which shows an exit of a toll road in which an automatic toll collection system according to the first embodiment of the invention is installed.

Referring now to the drawings, particularly to FIG. 1, there is shown an automatic toll collection system according to the first embodiment of the invention which is designed to collect tolls from a vehicle passing through a toll booth.

In the drawing, two ETC (Electronic Toll Collection) lanes 1 and a MTC (Manual Toll Collection) lane 2 extend through a toll booth. In each of the ETC lanes 1, tolls are automatically collected from each vehicle moving along it through radio communication between an electronic toll paying unit installed in the vehicle (referred to as an in-vehicle unit below) and a toll collecting unit installed on the ETC lane 1. In the MTC lane 2, tolls are collected manually from each vehicle which has entered it.

On each of the ETC lanes 1, a vehicle type identifying device 3, a license plate monitor camera 4, a communication entrance side vehicle detector 5, an antenna 6, a communication exit side vehicle detector 7, a display 8, a gate entrance side vehicle detector 9, a gate 10, a gate opening device 11 having a toll payment error card distributor or a gate opening manual switch, a gate exit side vehicle detector 12, and a monitor camera 13 are arranged. The toll payment error card distributor produces an error card when the in-vehicle unit is malfunctioning, that is, when tolls has not been collected correctly. When the driver takes the error card, the gate 10 is opened.

The vehicle type identifying device 3 identifies the type of a vehicle passing thereby. The license plate monitor camera 4 captures an image of a license plate of the vehicle to read a license plate number out of the image. The vehicle detectors 5 and 7 detect the vehicle to determine the timing for establishing communication with the vehicle. The vehicle detectors 9 and 12 detect the vehicle to determine the timing for opening and closing the gate 10.

A test station 20, as will be described later in detail, is provided at an exit of the toll booth for checking the in-vehicle unit which has been determined as being in an abnormal condition or which has not completed communication with the toll collecting unit on either of the ETC lanes 1. Through the test station 20, a test lane extends from the exit of the toll booth outside the roadway.

If the abnormal condition in which it is impossible to collect tolls from the in-vehicle unit correctly is encountered in either of the ETC lanes 1, then the display 8 indicates "Go to Test Station". The driver brings the vehicle to the test station 20 and has a check for the status of the in-vehicle unit through a testing unit 21. The testing unit 21 informs a toll house 22 of test results. For example, when a vehicle having no in-vehicle unit has entered either of the ETC lanes 1 in error, the toll house 22 collects tolls manually. Alternatively, when the in-vehicle unit is malfunctioning, it is repaired or replaced. After having paid the tolls manually or electronically, the vehicle returns to the roadway through a gate 23.

Figure 2:
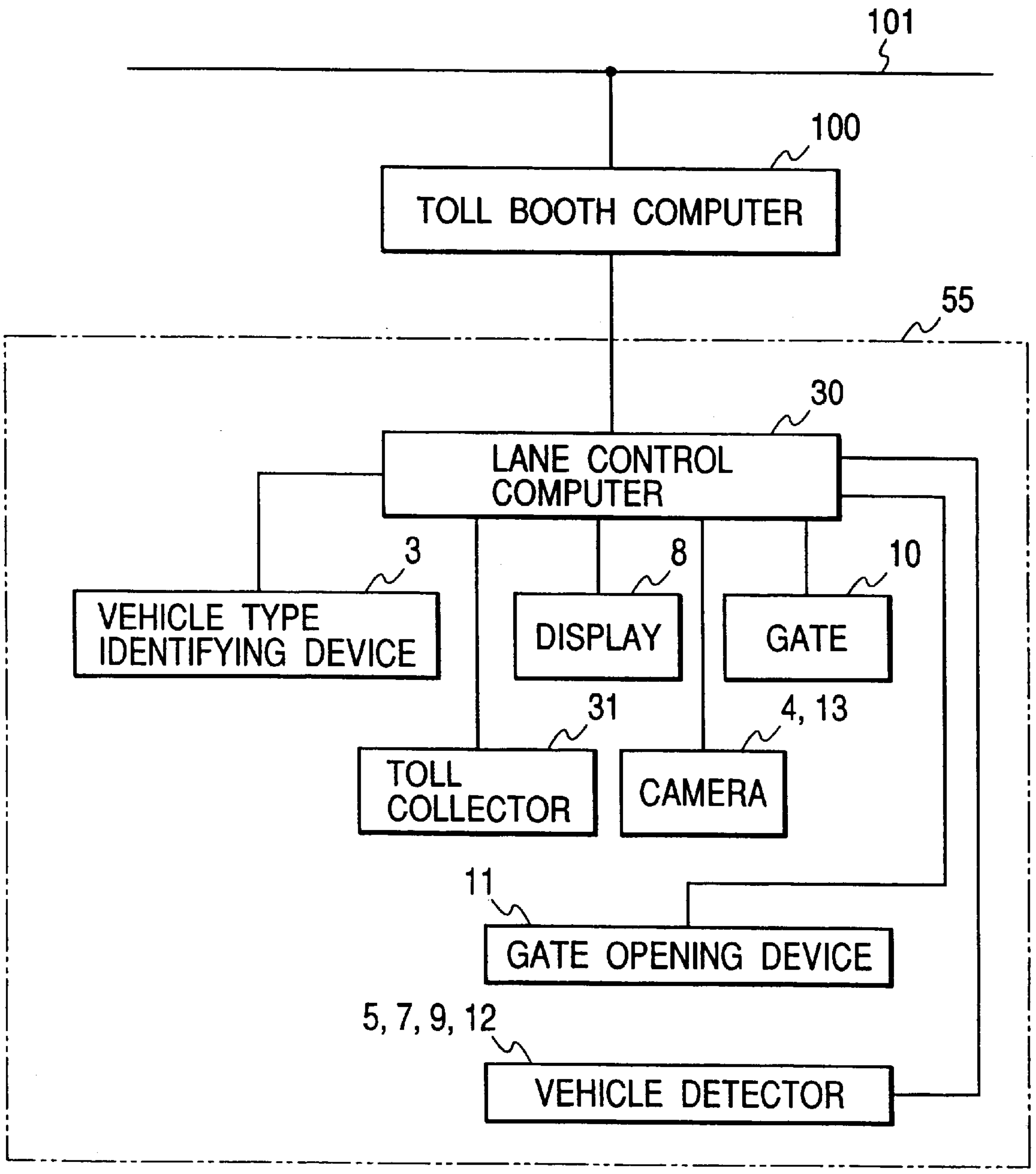
FIG. 2 is a block diagram which shows a control device installed on an electronic toll collection lane.

The automatic toll collection system includes a control device 55, as shown in FIG. 2, one for each ETC lane 1. The control device 55 has a lane control computer 30 which controls operations of the vehicle type identifying device 3, the license plate monitor camera 4, the monitor camera 13, the vehicle detectors 5, 7, 9, and 12, the gate 10, and the toll collecting unit 31 (including the antenna 6 in FIG. 1) to identify the vehicles passing through the ETC lane 1 and to indicate through the display 8 the amount of tolls collected by the toll collecting unit 31. The control device 55 receives information signals from the vehicle detectors 9 and 12 each indicating the passing of the vehicle to open and close the gate 10 and is responsive to an ON signal from the gate opening device 11 to open the gate 10.

The lane control computer 30 communicates with a toll booth computer 100. The toll booth computer 100 communicates with a network 101 for transmission of information among itself, a test station computer, as will be described later in detail, and a centerized control computer (not shown).

Figure 3:
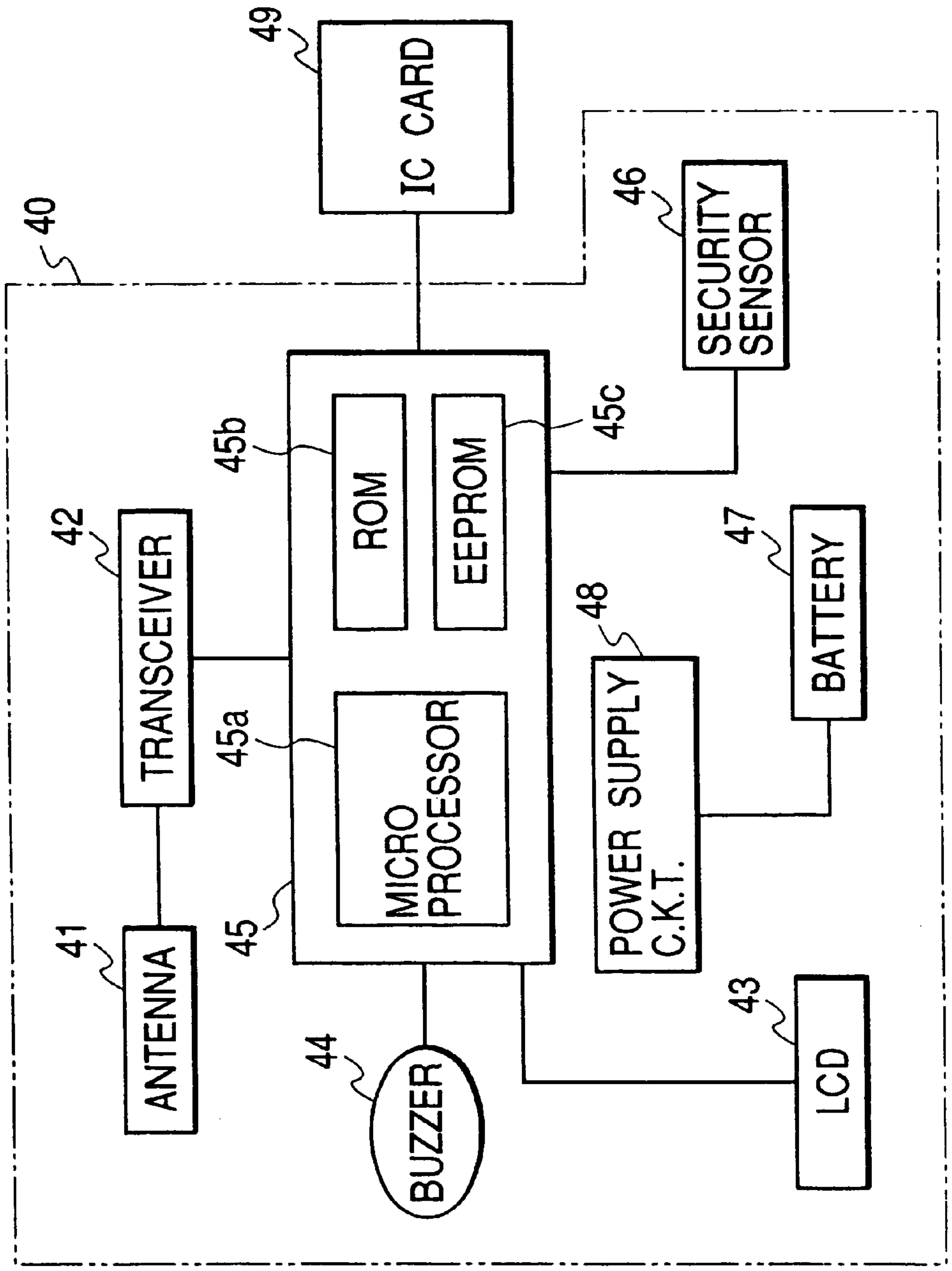
FIG. 3 is a block diagram which shows an in-vehicle unit.

FIG. 3 shows the in-vehicle unit installed in each vehicle passing through either of the ETC lanes 1.

The in-vehicle unit 40 includes an antenna 41, a transceiver 42, a liquid-crystal display (LDC) 43, a buzzer 44, and a control circuit 45. The transceiver 42 establishes radio communication between the in-vehicle unit 40 and the toll collecting unit through the antenna 41. The LCD 43 indicates balance information of the IC card 49 and error information of the in-vehicle unit 40. The control circuit 45 controls the buzzer 44, the LCD 43, and the transceiver 42 to perform given functions in an automatic toll payment mode.

The control circuit 45 also includes a microprocessor 45*a*, a mask ROM 45*b*, and an EEPROM 45*c*. The mask ROM 45*b* stores therein programs for automatic toll payment. The microprocessor 45*a* performs the programs stored in the mask ROM 45*b*. The EEPROM 45*c* stores therein ID data on the in-vehicle unit 40 and status data, as will be described later in detail.

The in-vehicle unit 40 also includes a battery 47, a power supply circuit 48, and a security sensor 46. The battery 47 connects with the power supply circuit 48. The power supply circuit 48 supplies the power to the components of the in-vehicle unit 40.

The above described components of the in-vehicle unit 40 are installed in a casing. Upon insertion of the IC card 49 into the casing, the control circuit 45 reads and writes toll payment data out of and in the IC card 49.

The security sensor 46 detects opening of the casing of the in-vehicle unit 40 by an unauthorized person and outputs a sensor signal to the control circuit 45 which indicates the possibility of the data in the in-vehicle unit 40 has been altered. The security sensor 46 may have the structure, as taught in Japanese Patent First Publication No. 6-12589, wherein wire is attached to an inner surface of a casing of an in-vehicle unit to detect disassembling of the unit when the wire is cut or the structure wherein a photosensor is used to detect incidence of light when the casing is opened.

Figure 4:
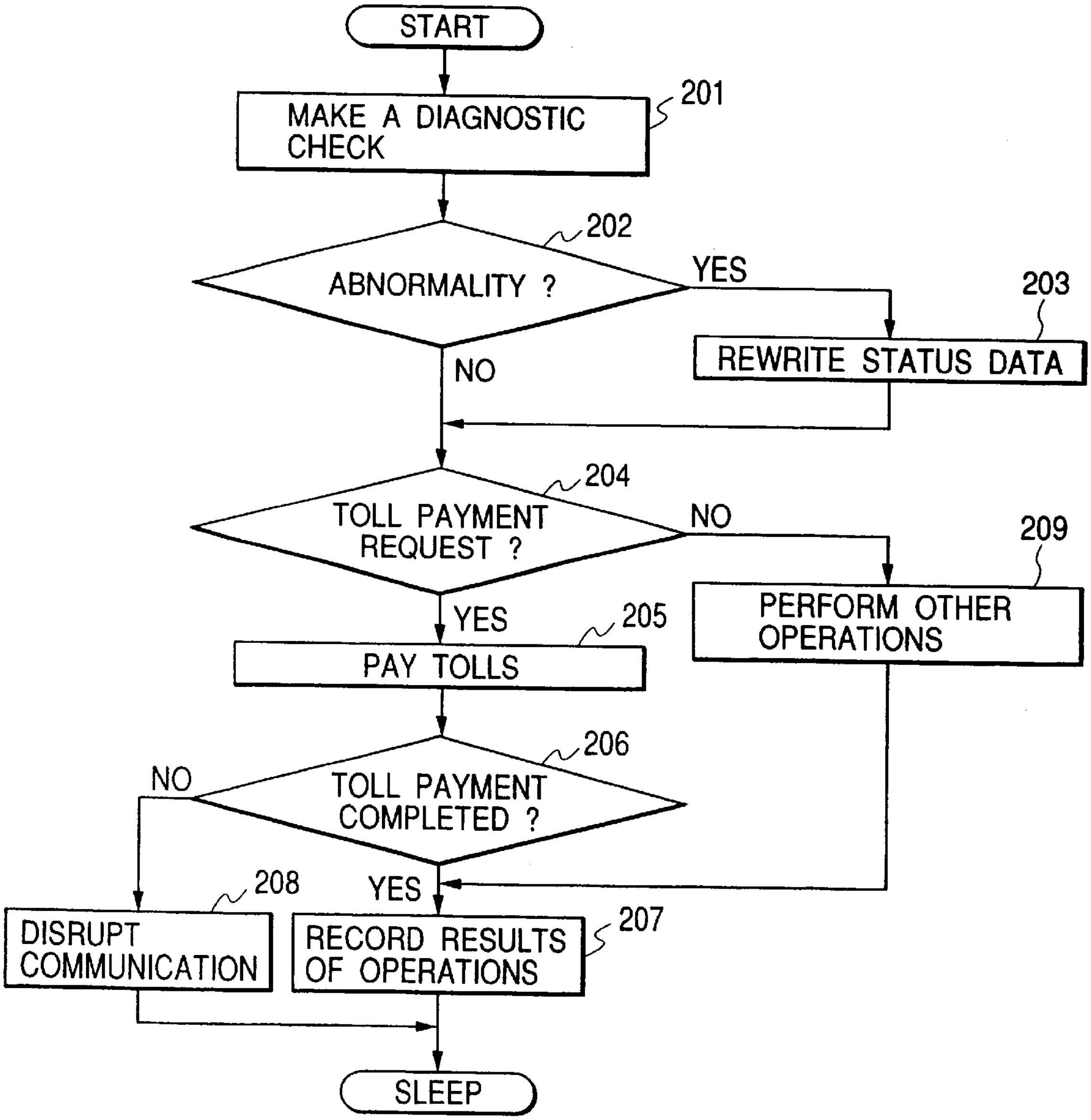
FIG. 4 is a flowchart of a program performed by the in-vehicle unit of FIG. 3.

FIG. 4 shows a program or sequence of logical steps performed by the control circuit 45 of the in-vehicle unit 40.

When the in-vehicle unit 40 enters a communication area of the toll collecting unit 31, the control unit 45 is switched from a sleep mode to an operation mode to initiate the program.

First, in step 201, a diagnostic check is made to inspect functions of the in-vehicle unit 40. The routine proceeds to step 202 wherein it is determined whether the functions of the in-vehicle unit 40 indicate abnormalities or not. If a YES answer is obtained, then the routine proceeds to step 203 wherein a corresponding error code(s) of status data is rewritten, as listed in FIG. 5.

After either of steps 202 and 203, the routine proceeds to step 204 wherein it is determined whether a toll payment request signal has been outputted from the toll collecting unit 31 or not. If a YES answer is obtained, then the routine proceeds to step 205 wherein required tolls are paid electronically. The routine proceeds to step 206 wherein it is determined whether the payment of tolls has been completed or not. If a YES answer is obtained, then the routine proceeds to step 207 wherein a payment completion signal is outputted to the toll collecting unit 31, and a communication result is recorded.

If a NO answer is obtained in step 206 meaning that the payment of toll has not been completed, then the routine proceeds to step 208 wherein the communication with the toll collecting unit 31 is disrupted and a fact thereof is recorded in the in-vehicle unit 40.

If a NO answer is obtained in step 204 meaning that commands other than the toll payment have been inputted into the in-vehicle unit 40, then the routine proceeds to step 209 wherein corresponding operations are performed. The routine proceeds to step 207 wherein results of the operations are recorded.

After step 207 or 208, the in-vehicle unit 40 enters the sleep mode of operation.

Figure 6:
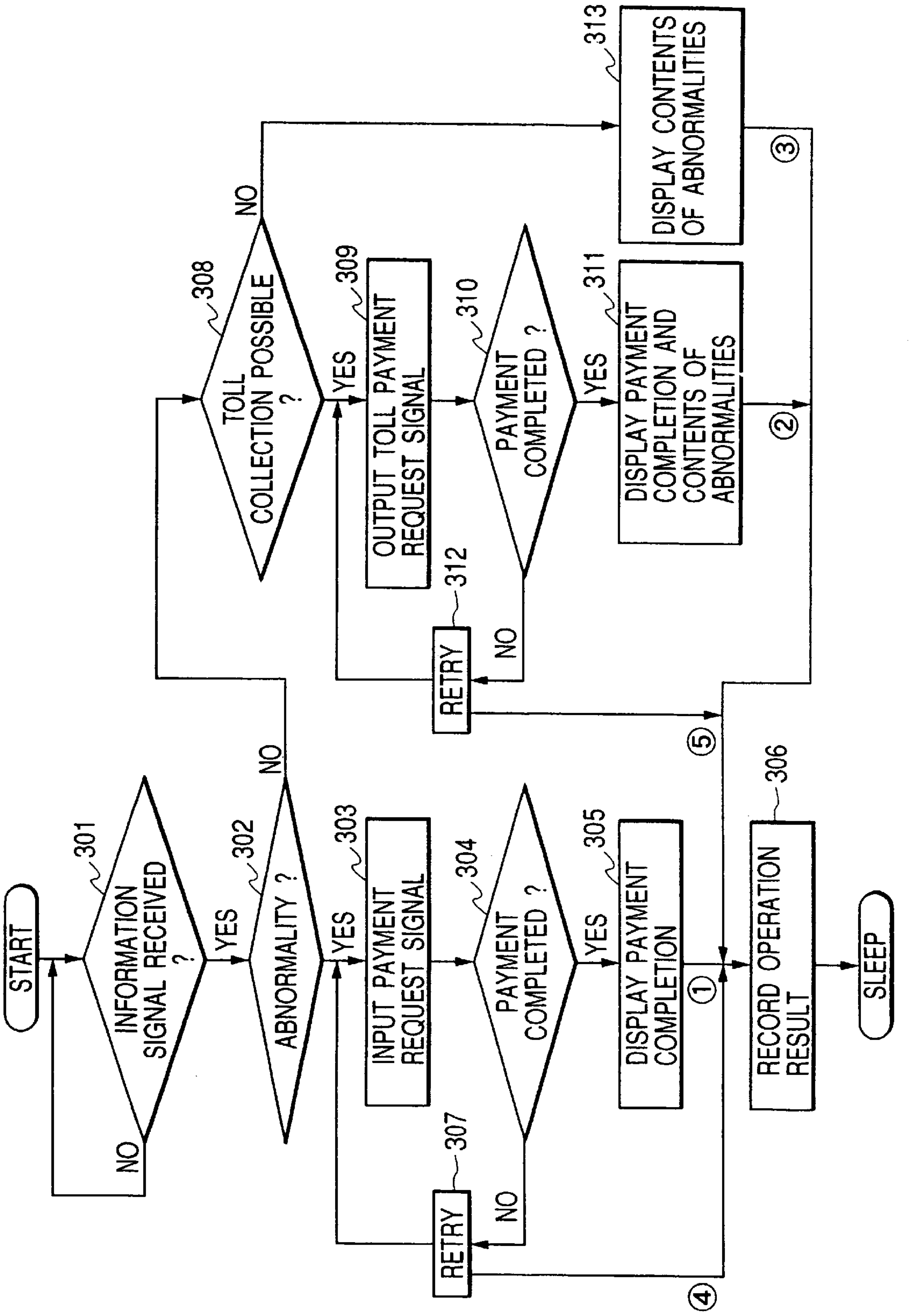
FIG. 6 is a flowchart of a program performed by a toll collecting unit of the control device of FIG. 2.

FIG. 6 shows a program or sequence of logical steps performed by the toll collecting unit 31.

After entering the program, the routine proceeds to step 301 wherein it is determined whether there is an answer signal from the in-vehicle unit 40 or not. This determination is made in cycles until a YES answer is obtained. If a YES answer is obtained, then the routine proceeds to step 302 wherein the status data is read out of the in-vehicle unit 40 and checked to determine whether the in-vehicle unit 40 is in the normal condition or not. If a YES answer is obtained, then the routine proceeds to step 303 wherein the toll payment request signal is outputted to the in-vehicle unit 40. The routine proceeds to step 304 wherein it is determined whether the payment completion signal, as provided in step 207 of FIG. 4, has been outputted from the in-vehicle unit 40 or not. If a YES answer is obtained, then the routine proceeds to step 305 wherein a command is issued for the in-vehicle unit 40 to display the fact that the payment completion signal has been received by the toll collecting unit 31. The routine proceeds to step 306 wherein the operation in step 305 is recorded.

If a NO answer is obtained in step 304, then the routine proceeds to step 307 wherein a retry operation is performed to output the toll payment request signal again to the in-vehicle unit 40. If the payment completion signal is still not outputted from the in-vehicle unit 40 after the toll payment request signal is outputted a given number of times, then the routine proceeds to step 306 wherein the communication with the in-vehicle unit 40 is disrupted, and the fact thereof and an ID number of the in-vehicle unit 40 are recorded. The toll collecting unit 31 issues a command for the in-vehicle unit 40 to record which of the toll collecting units 31 the communication has been disrupted and which of operational steps had been completed when the communication was disrupted.

If a NO answer is obtained in step 302 meaning that the status data indicates the abnormalities of the in-vehicle unit 40, then the routine proceeds to step 308 wherein it is determined whether it is possible to collect the tolls from the in-vehicle unit 40 or not. If the abnormalities of the in-vehicle unit 40 as indicated by the status data allows the tolls to be paid correctly, for example, if the balance of the IC card 49 is smaller than a set amount of money, but it covers the amount of tolls to be paid or the capacity of the battery 47 is lowered, then the routine proceeds to step 309 wherein the toll payment request signal is outputted to the in-vehicle unit 40.

The routine proceeds to step 310 wherein it is determined whether the payment completion signal has been outputted from the in-vehicle unit 40 or not. If a YES answer is obtained, then the routine proceeds to step 311 wherein a command is issued for the in-vehicle unit 40 to display the fact that the payment completion signal has been received by the toll collecting unit 31 and contents of the abnormalities of the in-vehicle unit 40 as indicated by the status data. The routine proceeds to step 306 wherein the operation in step 305 is recorded.

If a NO answer is obtained in step 310, then the routine proceeds to step 312 wherein a retry operation is performed to output the toll payment request signal again to the in-vehicle unit 40. If the payment completion signal is still not outputted from the in-vehicle unit 40 after the toll payment request signal is outputted a given number of times, then the routine proceeds to step 306 wherein the communication with the in-vehicle unit 40 is disrupted, and the fact thereof is recorded.

If a NO answer is obtained in step 308 meaning that the status data indicates the impossibility to collect the tolls from the in-vehicle unit 40, for example, if the balance of the IC card 49 is insufficient to cover the amount of tolls to be paid, the IC card 49 is not inserted into the in-vehicle unit 40, an improper IC card is inserted into the in-vehicle unit 40, or the in-vehicle unit 40 has been opened by an unauthorized person, then the routine proceeds to step 313 wherein a command is issued for the in-vehicle unit 40 to display the contents of the abnormalities of the in-vehicle unit 40 as indicated by the status data and instructions to go to the test station 20, and the lane control computer 30 of the toll collecting unit 40 is informed of the abnormalities of the in-vehicle unit 40, and the errors are displayed in the display 8.

The above operation of the toll collecting unit 31 classifies conditions of the in-vehicle unit 40 into five types as listed below.

(1) The payment of tolls is completed, and the in-vehicle unit 40 is in the normal condition (2) The payment of tolls is completed, and the in-vehicle unit 40 is in the abnormal condition (3) The in-vehicle unit 40 is in the abnormal condition, and it is impossible to collect tolls from the in-vehicle unit 40

(4) The in-vehicle unit 40 is in the normal condition, but it is impossible to collect tolls from the in-vehicle unit 40

(5) The in-vehicle unit 40 is in the abnormal condition, but it is possible to collect tolls from the in-vehicle unit 40

Figure 7:
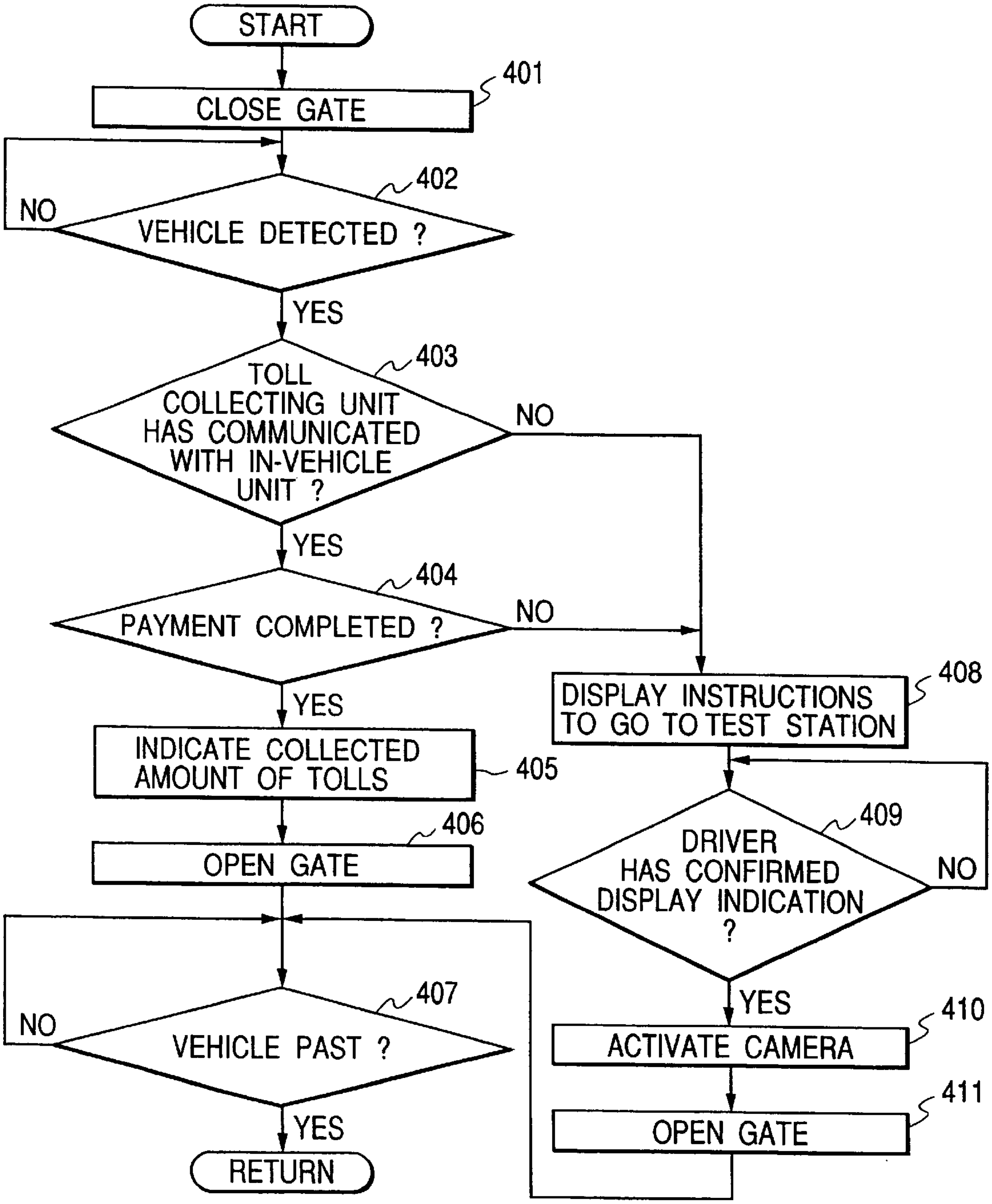
FIG. 7 is a flowchart of a program performed by a lane control computer of the control device of FIG. 2.

FIG. 7 shows an operation or program performed by the lane control computer 30 of the control device 55.

The lane control computer 30, as can be seen in FIG. 2, controls the toll collecting unit 31, the vehicle type identifying device 3, the display 8, the cameras 4 and 13, and the gate 10.

Upon initiation of the program, the routine proceeds to step 401 to close the gate 10. The routine proceeds to step 402 wherein an output from the vehicle type identifying device 3 is monitored to determine whether a vehicle has entered the ETC lane 1 or not. If a YES answer is obtained, then the routine proceeds to step 403 wherein it is determined whether the toll collecting unit 31 has communicated with the in-vehicle unit 40 or not. If a YES answer is obtained, then the routine proceeds to step 404 wherein it is determined whether the payment of tolls has been completed or not by monitoring the communication between the in-vehicle unit 40 and the toll collecting unit 31. If a YES answer is obtained, then the routine proceeds to step 405 wherein the amount of tolls collected from the in-vehicle unit 40 is indicated through the display 8. The routine proceeds to step 406 to open the gate 10. The routine proceeds to step 407 wherein it is determined whether the vehicle has passed through the vehicle detector 12 or not. If a YES answer is obtained, then the routine returns back to the initial step.

If the toll collecting unit 31 fails to communicate with the vehicle, for example, because the vehicle does not have the in-vehicle unit 40 or if the collection of tolls is not completed and the toll collecting unit 31 indicates the abnormalities of the in-vehicle unit 40, a NO answer is obtained in step 403, and the routine proceeds to step 408 wherein the display 8 indicates instructions to go to the test station 20. After the driver of the vehicle confirms the indication on the display 8, the driver takes the error card out of the toll payment error card distributor or pushes the gate opening manual switch installed in the gate opening device 11, for example, for opening the gate 10.

The routine proceeds to step 409 wherein the lane control computer 30 monitors the operation of the gate opening device 11 to determine whether the driver has confirmed the indication on the display 8 or not. If a YES answer is obtained, then the routine proceeds to step 410 wherein upon opening of the gate 10, the monitor camera 13 is activated to photograph the vehicle including a license plate and/or the driver which has operated the gate opening device 11. The routine proceeds to step 411 wherein the gate 10 is opened.

Figure 8:
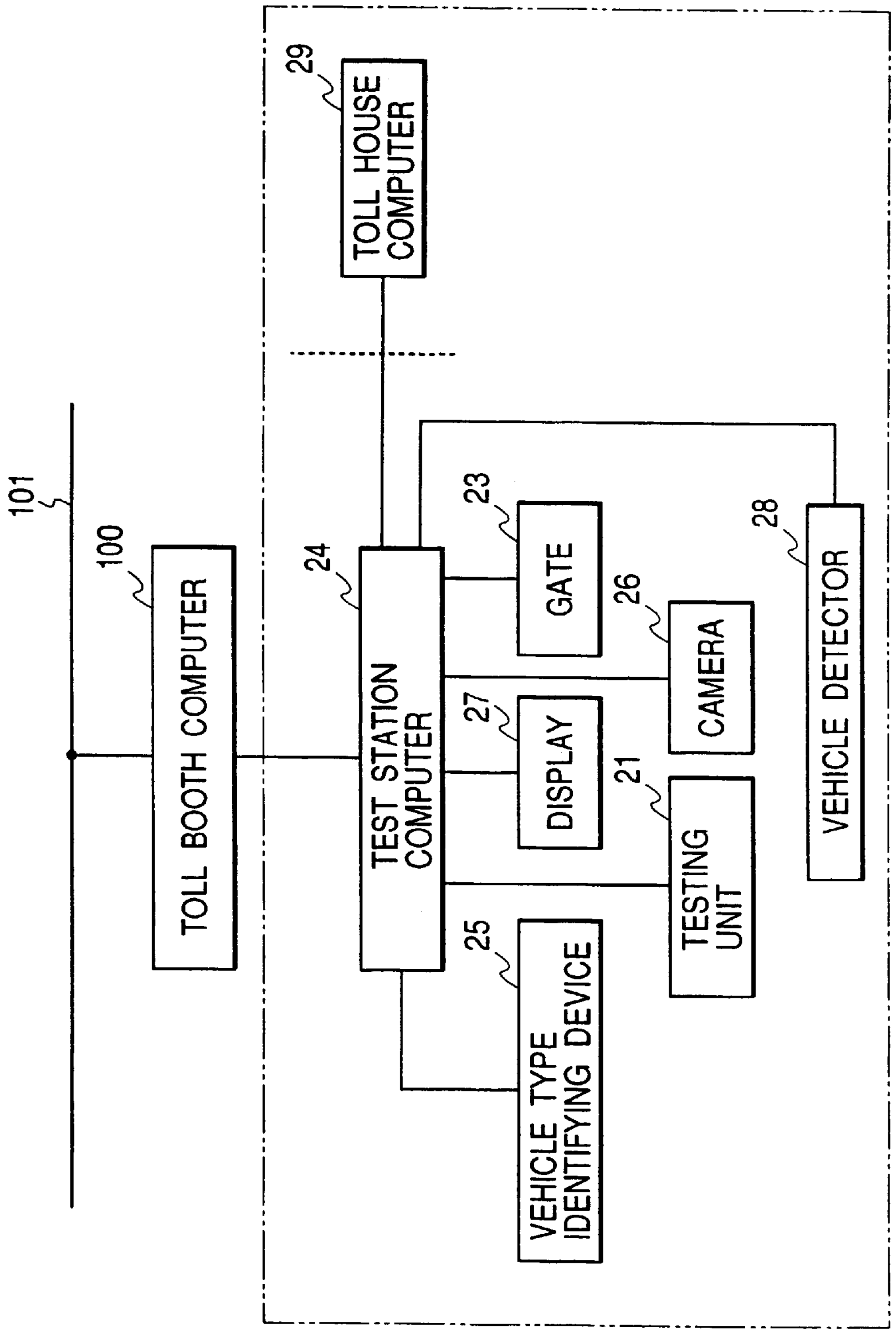
FIG. 8 is a block diagram which shows a control device of a test station.

FIG. 8 shows the control device 60 installed in the test station 20. The control device 60 includes the test station computer 24 which controls operations of the testing unit 21, the gate 23, the vehicle type identifying device 25, the cameras 26, the display 27, and the vehicle detector 28.

The vehicle type identifying device 25 is mounted in front of the toll house 22 and detects a vehicle passing therethrough and identifies the type of the vehicle using a laser, as will be described later in detail. The cameras 26 are mounted near the vehicle type identifying device 25 and photographs the vehicle passing thereby. The display 27 is installed in a window of the toll house 22 to give the driver of the vehicle various instructions. The vehicle detector 28 detects the passage of the vehicle through the gate 23 and closes the gate 23.

The test station computer 24 monitors communication between the testing unit 21 and the in-vehicle unit 40 to transmit to the toll house computer 29 troubleshooting information on measures to be taken to cure the abnormalities of the in-vehicle unit 40. The test station computer 24 connects with the toll booth computer 100 and transmits information on the abnormalities or troubles of the in-vehicle unit 40 to the network 101.

Figure 9:
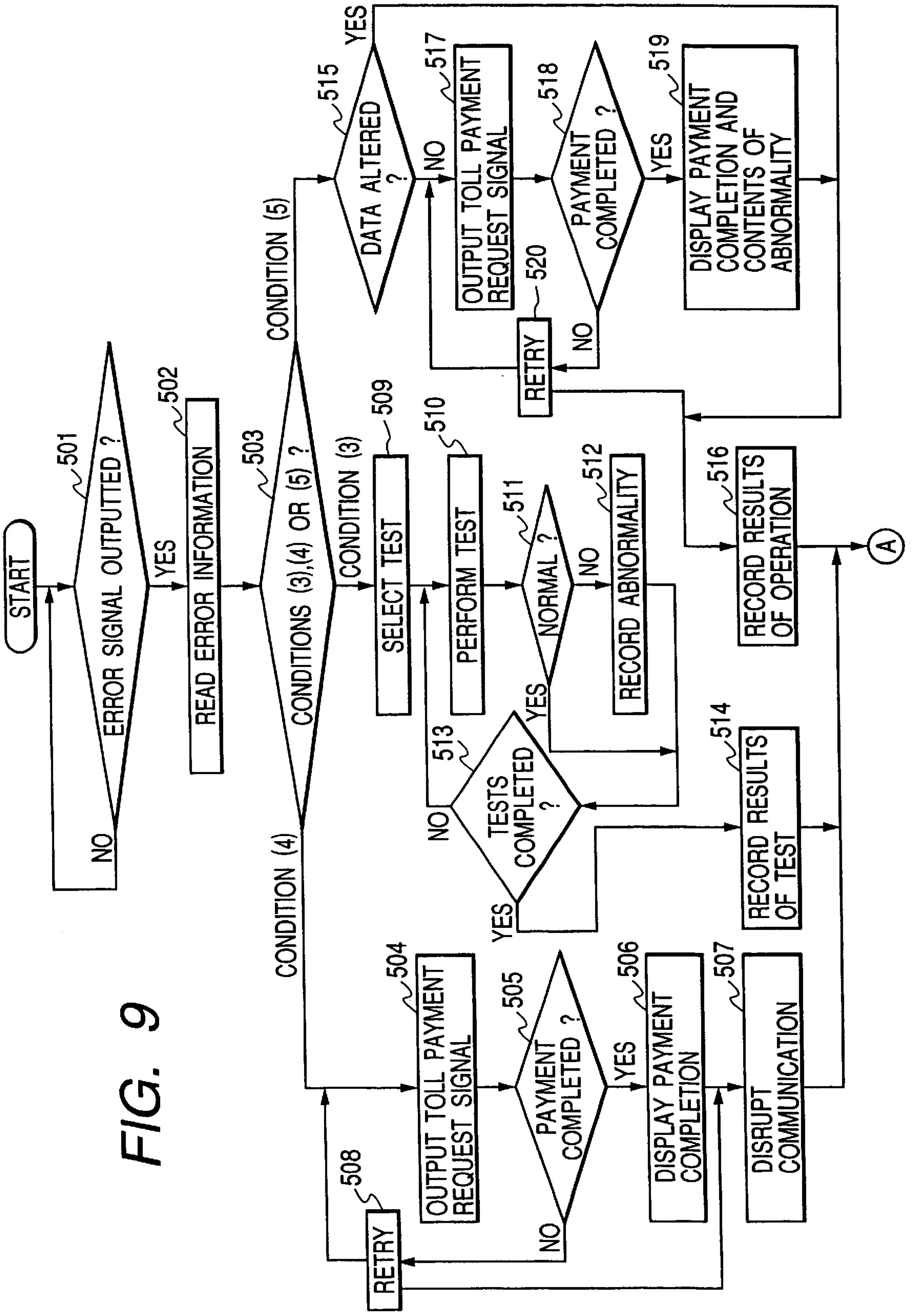
FIGS. 9 and 10 show a flowchart of a program performed by a testing unit of a test station.

FIG. 9 shows an operation or program performed by the testing unit 21.

Upon initiation of the program, the routine proceeds to step 501 wherein it is determined whether the error signal has been outputted from the in-vehicle unit 40 in step 208 of FIG. 4 or not. If a NO answer is obtained, then the routine performs step 501 again after a predetermined period of time. Alternatively, if a YES answer is obtained, then the routine proceeds to step 502 wherein the testing unit 21 reads the error information recorded in step 306 of FIG. 6 out of the toll collecting unit 31 installed on one of the ETC lanes 1 through which the vehicle having outputted the error signal has passed. The routine proceeds to step 503 to determine which of the conditions (1) to (5), as indicated in FIG. 6, the error information shows.

If the condition (4) is encountered meaning that the in-vehicle unit 40 is in the normal condition, but it is impossible to collect tolls from the in-vehicle unit 40, then the routine proceeds to step 504 wherein the toll payment request signal is outputted to the in-vehicle unit 40.

The routine proceeds to step 505 wherein it is determined whether the payment completion signal has been outputted from the in-vehicle unit 40 or not. If a YES answer is obtained, then the routine proceeds to step 506 wherein a command is issued for the in-vehicle unit 40 to display the fact that the payment completion signal has been received by the toll collecting unit 31. The routine proceeds to step 507 wherein the operation in step 506 is recorded.

If a NO answer is obtained in step 505, then the routine proceeds to step 508 wherein a retry operation is performed to output the toll payment request signal again to the in-vehicle unit 40. If the payment completion signal is still not outputted from the in-vehicle unit 40 after the toll payment request signal is outputted a given number of times, then the routine proceeds to step 507 wherein the communication with the in-vehicle unit 40 is disrupted, and the fact thereof is recorded.

If the condition (3) is encountered meaning that the in-vehicle unit 40 is in the abnormal condition, and it is impossible to collect tolls from the in-vehicle unit 40, then the routine proceeds to step 509 wherein a test(s) is selected which corresponds to the abnormality or trouble of the in-vehicle unit 40 as indicated by the status data. The routine proceeds to step 510 wherein a test command is issued for the in-vehicle unit 40 to conduct the test(s) selected in step 509. The routine proceeds to step 510 wherein it is determined whether the in-vehicle unit 40 operates correctly under the test(s) or not by monitoring an output from the in-vehicle unit 40. If a NO answer is obtained, then the routine proceeds to step 512 wherein the fact that the in-vehicle unit 40 is in the abnormal condition is recorded. After step 512 or if a YES answer is obtained in step 511, then the routine proceeds to step 513 wherein it is determined whether the test(s) has been finished or not. If a YES answer is obtained, then the routine proceeds to step 514 wherein the results of the test(s) are recorded.

If the condition (5) is encountered meaning that the in-vehicle unit 40 is in the abnormal condition, but it is possible to collect tolls from the in-vehicle unit 40, then the routine proceeds to step 515 wherein the status data of the in-vehicle unit 40 is monitored to determine whether the unauthorized case opening flag which indicates the possibility of unauthorized disassembling of the in-vehicle unit 40 is set or not, that is, whether there is a possibility that the data in the in-vehicle unit 40 is altered or not. If the unauthorized case opening flag is set, then the routine proceeds to step 516 wherein the possibility of unauthorized disassembling of the in-vehicle unit 40 and an ID number of the in-vehicle unit 40 are recorded. Alternatively, if a NO answer is obtained in step 515, then the routine proceeds to step 517 wherein the toll payment request signal is outputted to the in-vehicle unit 40. The routine proceeds to step 518 wherein it is determined whether the payment completion signal has been outputted from the in-vehicle unit 40 or not. If a YES answer is obtained, then the routine proceeds to step 519 wherein a command is issued for the in-vehicle unit 40 to display the fact that the payment completion signal has been received by the toll collecting unit 31 and contents of the abnormality or trouble of the in-vehicle unit 40. The routine proceeds to step 516 wherein the operation in step 519 is recorded.

If a NO answer is obtained in step 518, then the routine proceeds to step 520 wherein a retry operation is performed to output the toll payment request signal again to the in-vehicle unit 40. If the payment completion signal is still not outputted from the in-vehicle unit 40 after the toll payment request signal is outputted a given number of times, then the routine proceeds to step 516 wherein the communication with the in-vehicle unit 40 is disrupted, and the fact thereof is recorded.

Figure 10:
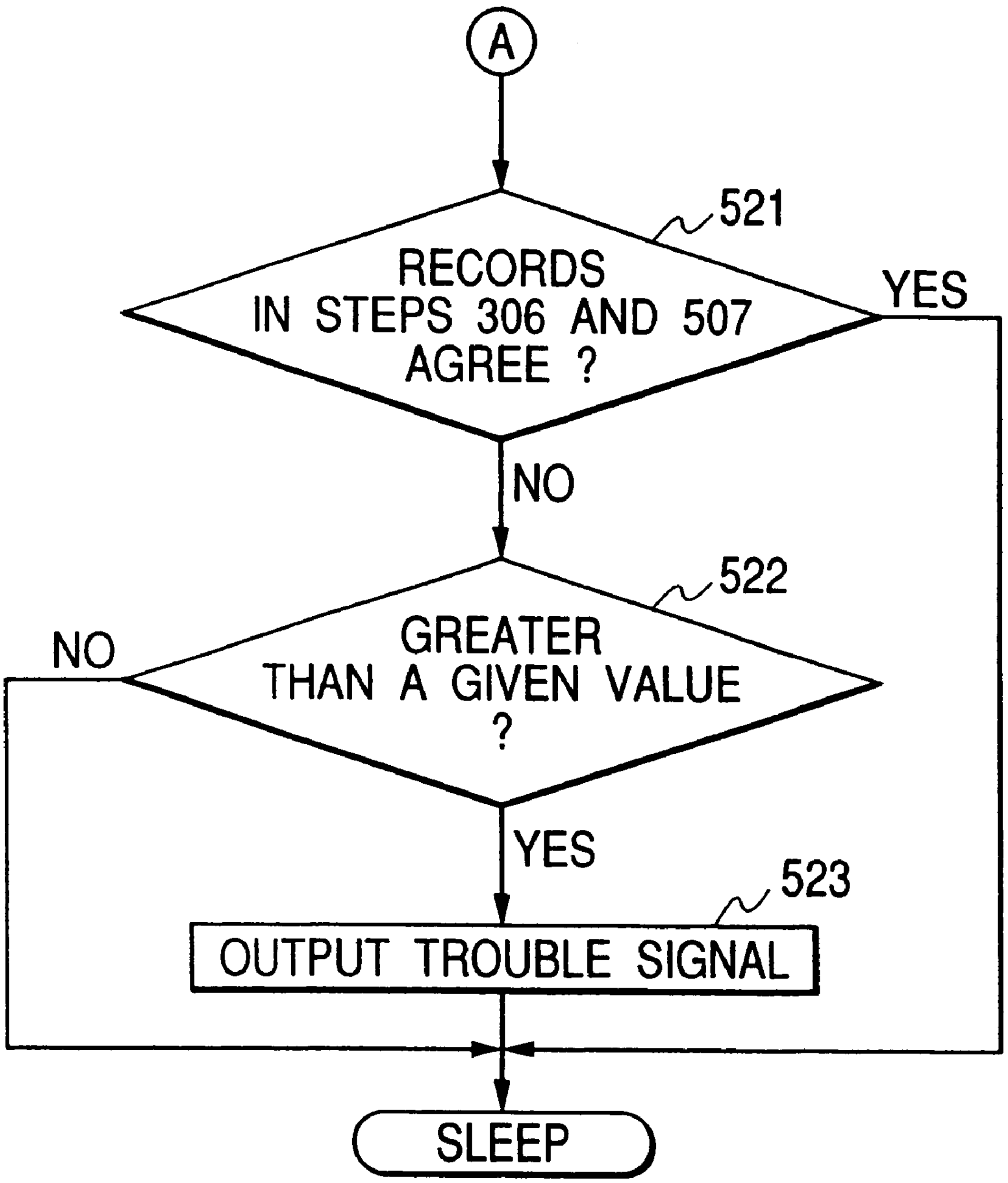

After step 507, 514, or 516, the routine proceeds to step 512 in FIG. 10 wherein it is determined whether information recorded in step 306 of FIG. 6 is identical with that recorded in step 507, 514, or 516 or not, that is, whether the contents of the abnormality or trouble of the in-vehicle unit 40 as determined by the toll collecting unit 31 agree with those determined in the operation of FIG. 9 or not. If a YES answer is obtained, then the routine returns back to step 502 of FIG. 9. Alternatively, if a NO answer is obtained, for example, if it was impossible to collect tolls from the in-vehicle unit 40 through the toll collecting unit 31, but the tolls has been collected from the in-vehicle unit 40 by the testing unit 21 at the test station 20, then the routine proceeds to step 522 wherein it is determined whether the number of the in-vehicle units 40 which caused the negative answer in step 521 for a predetermined period of time in each of the ETC lanes 1 is greater than a given value or not. If a YES answer is obtained concluding that the control device 55 installed in one of the ETC lanes 1 which has caused the positive answer in step 522 is malfunctioning, then the routine proceeds to step 523 wherein a trouble signal indicative of the malfunction of the control device 55 is outputted to the test station computer 24. The test station computer 24 informs the toll booth computer 100 of the malfunction of the control device 55 for troubleshooting.

Figure 11:
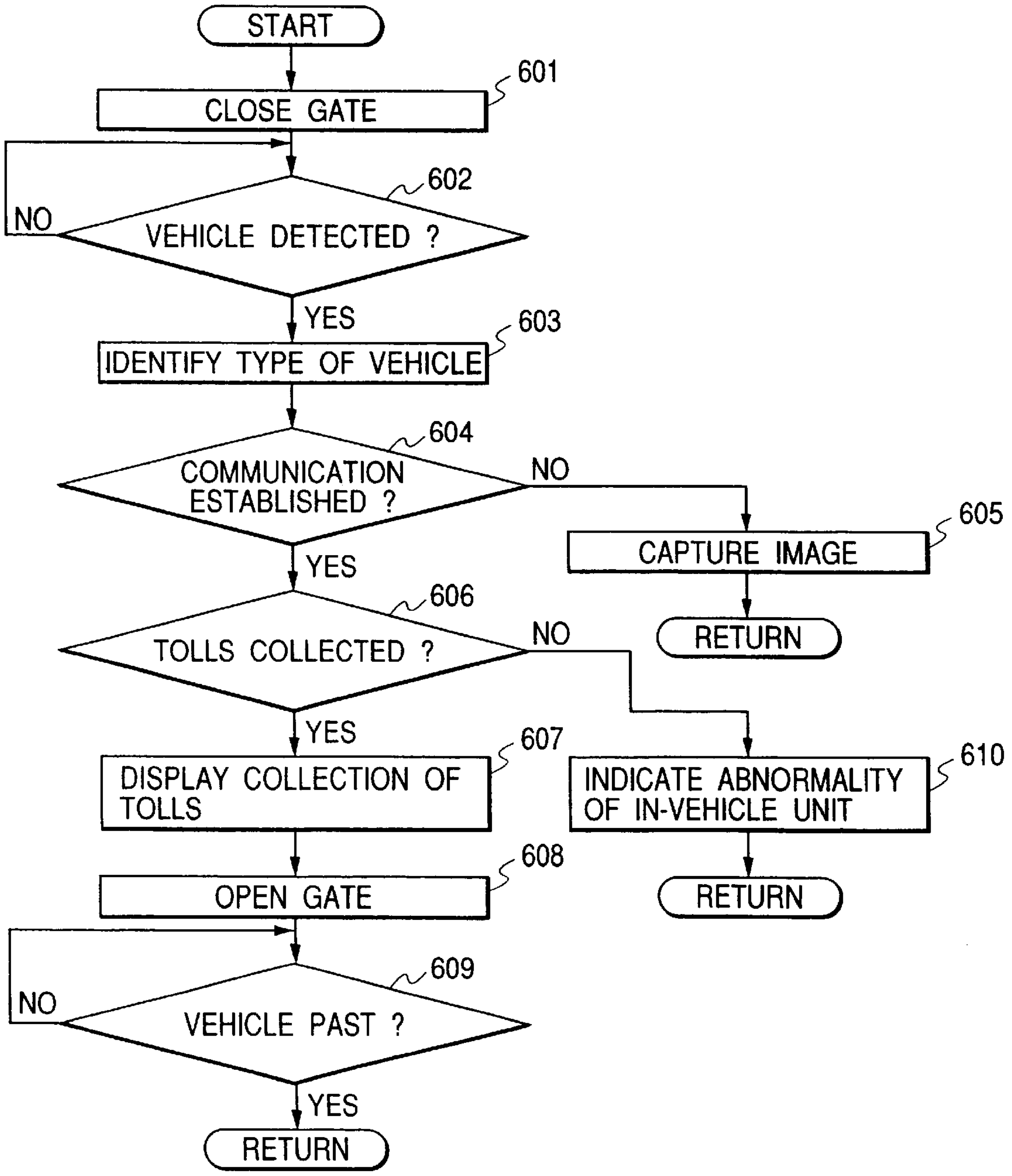
FIG. 11 shows a flowchart of a program performed by a test station computer.

FIG. 11 shows an operation or program performed by the test station computer 24.

Upon initiation of the program, the routine proceeds to step 601 to close the gate 23. The routine proceeds to step 602 wherein it is determined whether the vehicle has come in front of the toll house 22 or not based on an output signal from the vehicle type identifying device 25. If a YES answer is obtained, then the routine proceeds to step 603 wherein the output signal from the vehicle type identifying device 25 is monitored to determine the type of the vehicle.

The routine proceeds to step 604 wherein it is determined whether the communication has already been established between the vehicle and the testing unit 21 or not. If a NO answer is obtained concluding that the vehicle detected by the vehicle type identifying device 25 does not have mounted therein the in-vehicle unit 40, then the routine proceeds to step 605 wherein the test station computer 24 turns on the cameras 26 to capture an image of the appearance of the vehicle and transmits information that the vehicle does not have the in-vehicle unit 40 and the captured image to the toll house computer 29. The toll house computer 29 issues a command for the display 27 to indicate the information transmitted from the test station computer 24 visually. A toll keeper sees the indication on the display 27, collects required tolls from a driver of the vehicle manually, and opens the gate 23 to allow the vehicle to return to the roadway.

If a YES answer is obtained in step 604, then the routine proceeds to step 606 whether it is determined whether the testing unit 21 has collected tolls from the in-vehicle unit 40 correctly or not. If a YES answer is obtained, then the routine proceeds to step 607 wherein the fact that the testing unit 21 has collected tolls from the in-vehicle unit 40 correctly is indicated through the display 27 and communicated to the toll house computer 29. The routine proceeds to step 608 to open the gate 23. The routine proceeds to step 609 wherein it is determined whether the vehicle has passed the gate 23 or not based on an output signal from the vehicle detector 28. If a YES answer is obtained, then the routine returns to step 601.

If a NO answer is obtained in step 606 meaning that the testing unit 21 could not collect tolls from the in-vehicle unit 40 correctly, then the routine proceeds to step 610 wherein a command is issued for the display 27 to indicate that the in-vehicle unit 40 is in the abnormal condition, and information on communication between the testing unit 21 and the in-vehicle unit 40 is transmitted to the toll house computer 29. The toll house computer 29 displays and informs the toll keeper in the toll house 22 of troubleshooting information. The toll keeper takes measures, as discussed later in detail.

Figure 12:
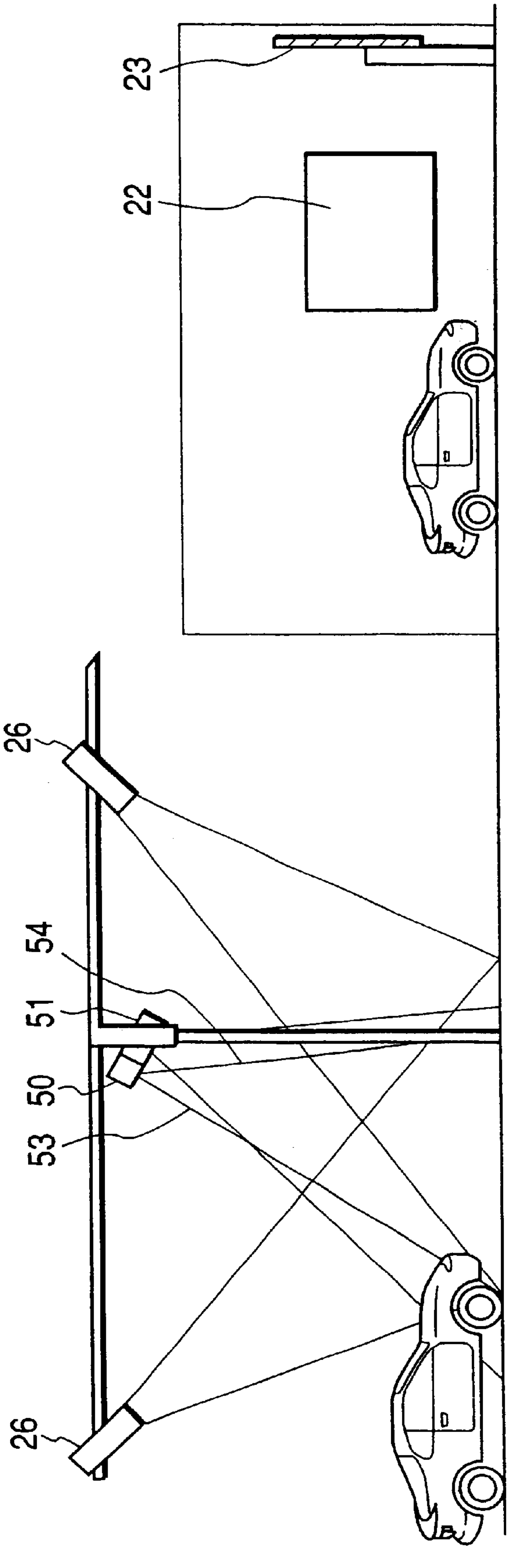
FIG. 12 is an illustration which shows a vehicle type identifying device installed in a test station.

The vehicle type identifying device 25 includes the laser unit 50, as shown in FIG. 12.

The laser unit 50 consists of a laser transceiver, a signal processing circuit, and an external interface (not shown). The laser transceiver has a polygon mirror which scans a laser beam over a given detection zone in front of the toll house 22.

In operation, the laser unit 50 emits a laser beam. The laser beam is reflected on an object such as a road surface and returns to the laser transceiver of the laser unit 50. The laser unit 50 determines the amount of time required by the laser beam to travel to and return from the object. When a vehicle enters the detection zone, the laser beam emitted from the laser unit 50 is reflected by the vehicle. Since the vehicle is closer to the laser unit 50 than the road surface, the amount of time required by the laser beam to travel to and return from the vehicle becomes shorter than that when there is no vehicle within the detection zone. This time difference is measured to determine the passage of the vehicle through the detection zone.

The laser unit 50 also determines the distance to the vehicle based on the amount of time required by the laser beam to travel to and return from the vehicle and analyzes an angular range occupied by the laser beam reflected from the vehicle to determine the size of the vehicle or identify the type of the vehicle. For example, a three-dimensional image of the vehicle may be produced using a change in distance to the vehicle measured through scans of the laser beam over the whole of the vehicle to identify the type thereof.

The speed of the vehicle passing through the detection zone may be measured by analyzing laser beams reflected from two points defined in the detection zone to calculate the amount of time required by the vehicle to travel between the two points.

The laser unit 50 also includes the transceiver 51 which communicates with the in-vehicle unit 40 to receive vehicle type information therefrom and transmits it to the test station computer 24 together with the above information on the vehicle entering the detection zone. The test station computer 24 determines whether the type of the vehicle indicated by the vehicle type information agrees with the one identified by the laser unit 50 or not. If a NO answer is obtained, the test station computer 24 informs the toll booth computer 100 of the disagreement of the type of the vehicle indicated by the vehicle type information with the one identified by the laser unit 50. When the status data of the in-vehicle unit 40 indicates an error in the type of the vehicle, the toll collecting unit 31 concludes that the in-vehicle unit 40 is malfunctioning and that it is impossible to collect tolls from the in-vehicle unit 40. In this case, if the type of the vehicle identified by the laser unit 50 agrees with the one indicated by the vehicle type information of the in-vehicle unit 40, then the test station computer 24 concludes that the toll collecting unit 31 is malfunctioning. When this conclusion is made a given number of times, the test station computer 24 outputs a trouble signal to the toll booth computer 100 to inform of the malfunction of the toll collecting unit 31. The toll collecting unit 31 takes a preselected measure to cure the malfunction of the toll collecting unit 31.

The transceiver 51 is able to communicate with the in-vehicle unit 40 within an area (i.e., a downlink area) where a signal from the transceiver 51 reaches the in-vehicle unit 40, however, it is advisable that the transceiver 51 be controlled so as to communicate with the in-vehicle unit 40 within part of the downlink area (i.e., an uplink area) where the in-vehicle unit 40 is able to communicate with the transceiver 51 with high quality. The laser unit 50, thus, emits a laser beam 53, as shown in FIG. 12, to a front end of the uplink area and a laser beam 54 to a rear end of the uplink area. When the two laser beams 53 and 54 both detect the vehicle, the transceiver 51 starts to communicate with the in-vehicle unit 40 for establishing high-quality communication therebetween.

The toll house computer 29, as described above, receives the information on abnormalities of the in-vehicle unit 40 from the test station computer 24 and displays the troubleshooting information. The toll keeper removes the in-vehicle unit 40 from the vehicle and takes a preselected measure. For example, when the test station computer 24 indicates that the in-vehicle unit 40 is malfunctioning, the toll keeper replaces the in-vehicle unit 40. Alternatively, when the test station computer 24 indicates the possibility of the data in the in-vehicle unit 40 being altered, the toll keeper questions the driver about the data alteration of the in-vehicle unit 40.

Figure 13:
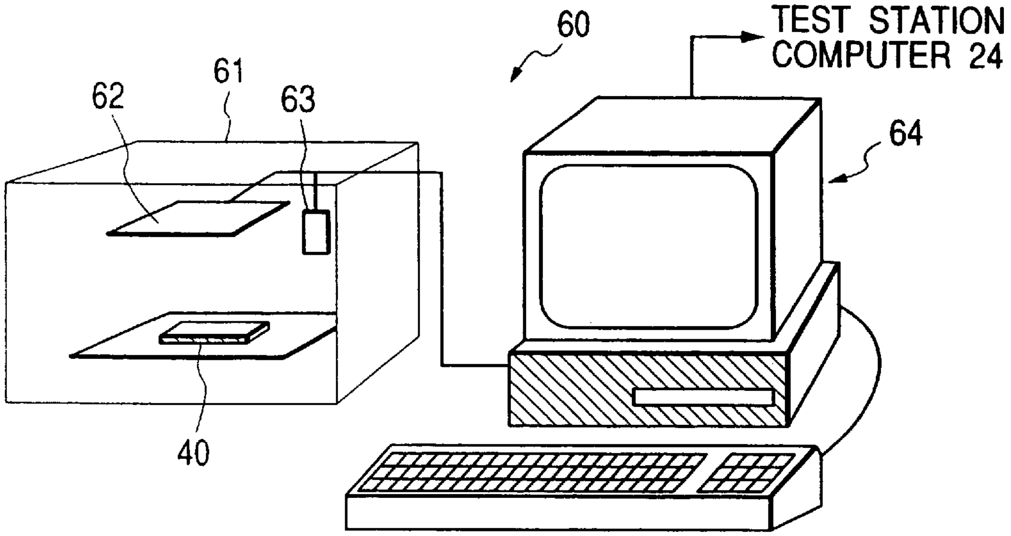
FIG. 13 is a perspective view which shows an in-vehicle unit adjusting device.

The in-vehicle unit 40 withdrawn by the toll keeper is checked to locate causes of the abnormalities and repaired. An in-vehicle unit adjusting device 60, as shown in FIG. 13, is installed in the toll house 22 which is designed to reprogram or rewrite data in the in-vehicle unit 40.

The in-vehicle unit adjusting device 60 includes an electromagnetic wave-shielding box 61, an antenna 62, a CCD camera 63, and a controller 64. The antenna 62 and the CCD camera 63 are installed in the electromagnetic wave-shielding box 61 and connect with the controller 64. The CCD camera 63 monitors the man/machine interface of the in-vehicle unit 40. The controller 64 is designed to be loaded from a control program storage device with programs needed to adjust the in-vehicle unit 40 and allow required one of the programs to be selected manually. For security purposes, it is advisable that the controller 64 be designed to operate in response to input of a password or insertion of an IC card for allowing specified users to gain access to data in the controller 64.

The controller 64 gives the in-vehicle unit 40 instructions as represented by a selected program to execute a predetermined sequence of operations and analyzes results of the operations to determine and display the status of the in-vehicle unit 40. An image captured by the CCD camera 63 is indicated on a display of the controller 64 to determine whether the man/machine interface is normal or not. The controller 64 records therein the status of the in-vehicle unit 40 and an ID number thereof.

If the in-vehicle unit 40 was disassembled by an unauthorized person, it is recorded in the status data, as shown in FIG. 5. The controller 64 can analyze the status data to know whether the in-vehicle unit 40 was disassembled to alter data thereof or not. For example, if an unauthorized person tried to disassemble the in-vehicle unit, but gave up without altering the data, only the status data is changed. In this case, rewriting the status data allows the in-vehicle unit 40 to be used again.

Figure 14:
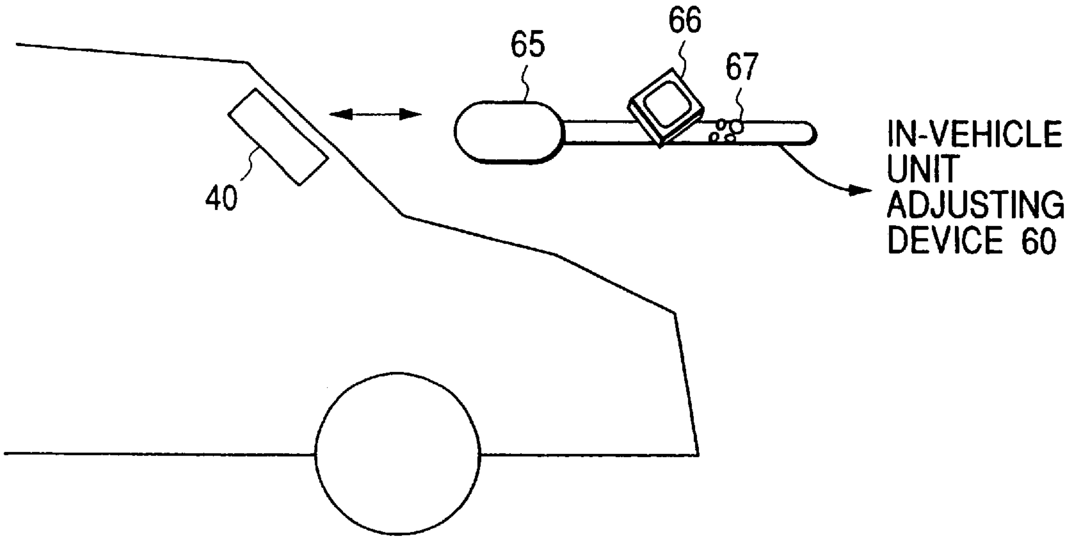
FIG. 14 is an illustration which shows a modified form of the in-vehicle adjusting device of FIG. 13.

Even if the in-vehicle unit adjusting device 60 determines that the status of the in-vehicle unit 40 is normal, it may become impossible for the in-vehicle unit 40 reinstalled in the vehicle to communicate with the toll collecting unit 31. This is because radio waves radiated from the in-vehicle unit 40 attenuate greatly due to the shape of a hood and a wind shield glass of the vehicle and the location where the in-vehicle unit 40 is mounted. For avoiding this problem, a portable in-vehicle unit adjusting device, as shown in FIG. 14, which is capable of adjusting the in-vehicle unit 40 mounted in the vehicle in the same manner as that of the in-vehicle unit adjusting device 60 may be employed. The portable in-vehicle unit adjusting device includes the antenna 65, the display 65, and the manual switch 67 and is connected to the controller 64.

Figure 15:
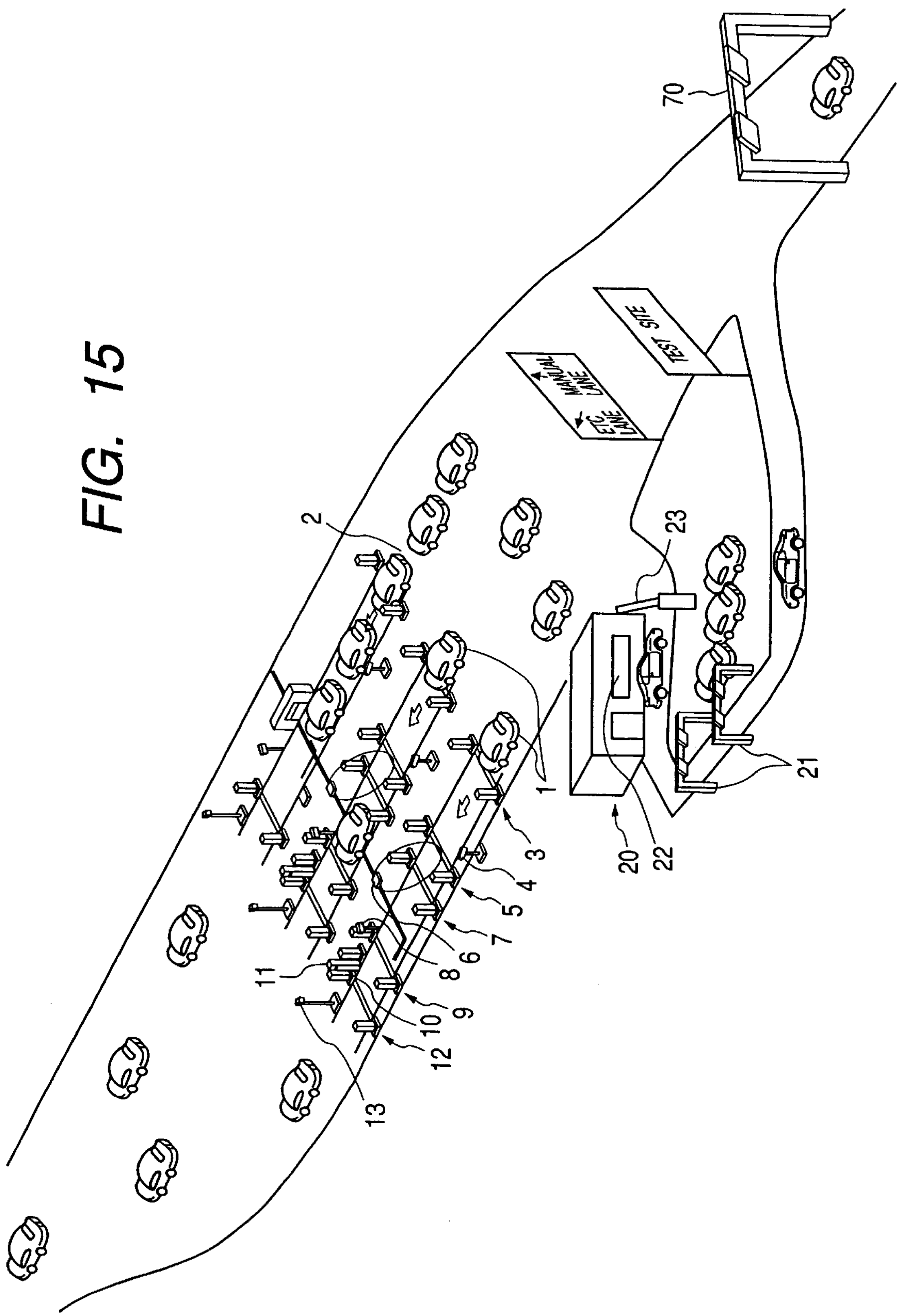
FIG. 15 is a perspective view which shows an exit of a toll road in which an automatic toll collection system according to the second embodiment of the invention is installed.

FIG. 15 shows an automatic toll collection system according to the second embodiment of the invention which is different from the first embodiment in that the test station 20 is provided in front of the toll booth for checking the status of the in-vehicle unit 40 before the vehicle enters either of the ETC lanes 1. In the first embodiment, when a vehicle which has past through the central ETC lane 1 goes to the test station 20, it is necessary to pay attention to a traffic flow from the left ETC lane 1, thus causing traffic congestion at the exit of the central ETC lane 1. This embodiment is aims at alleviating this problem.

A pre-toll collecting unit 70 is mounted on, for example, a ramp in front of the toll booth which serves to check the status data of the in-vehicle unit 40 of each vehicle and collect tolls therefrom. Each ETC lane 1 confirms whether the in-vehicle unit 40 of each vehicle has completed the payment of tolls or not.

When the pre-toll collecting unit 70 detects an abnormality of the in-vehicle unit 40, it issues a command for a display (not shown) mounted behind the pre-toll collecting unit 70 to indicate "Go to Test Station". The test station 20 troubleshoots the in-vehicle unit 40 in the same manner as that in the first embodiment.

The pre-toll collecting unit 70 may alternatively be designed to check the status data of the in-vehicle unit 40 only without collecting the tolls. In this case, each ETC lane 1 collects the tolls from each vehicle in the same manner as that in the first embodiment.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A system for automatic collection of tolls from a vehicle moving along a roadway comprising:

a toll collecting facility installed on the roadway, said toll collecting facility including toll collectors which collect the tolls from in-vehicle units installed in vehicles through radio communication with the in-vehicle units, respectively, each of the in-vehicle units working to execute an automatic toll payment task and determine whether the automatic toll payment task has been completed or not, when it is determined that the automatic toll payment task has been completed, the in-vehicle units outputting a payment completion signal, while when it is determined that the automatic toll payment task has not been completed, the in-vehicle units disrupting communication with the toll collectors and recording a fact thereof, each of the toll collectors determining whether the payment completion signal has been outputted from a corresponding one of the in-vehicle units or not, when it is determined that the payment completion signal has not been outputted, the toll collector disrupting communication with the corresponding one of the in-vehicle units, recording a fact thereof as indicating an abnormal condition, and commanding the corresponding in-vehicle unit to record data regarding with which of the toll collectors the communication has disrupted; and an inspecting facility that inspects the in-vehicle units of the vehicles which are determined by the toll collectors of said toll collecting facility to have encountered said abnormal conditions, said inspecting facility being located outside the roadway, said inspecting facility including a testing unit which compares a result of the inspection of each of the in-vehicle units with the abnormal condition as recorded in a corresponding one of the toll collectors to determine whether the abnormal condition is caused by the in-vehicle unit or the toll collector and which works to collect the toll from the in-vehicle unit, if the result of the inspection disagrees with the abnormal condition, and the testing unit has collected the tolls from the in-vehicle unit, the testing unit analyzing the data recorded in the in-vehicle unit to identify one of the toll collectors with which the communication of the in-vehicle unit has been disrupted and determining that the abnormal condition is caused by the toll collector, when it is determined that the abnormal condition is caused by the in-vehicle unit, said inspecting facility indicates a fact thereof on a display in said inspecting facility.

2. A system as set forth in claim 1, wherein when the number of the in-vehicle units as determined by the same toll collector to have disagreed with the abnormal conditions reaches a given value, said testing unit determines that the toll collector is malfunctioning.

3. A system as set forth in claim 1, wherein each of the in-vehicle unit checks functions thereof and stores therein status data on abnormalities of the functions, each of the toll collectors analyzes the status data of the in-vehicle unit to check whether the in-vehicle unit is in an abnormal condition or not and whether the payment completion signal has been outputted from the in-vehicle units or not and records the results of the checks, and the testing unit reads data on the results of the checks out of the toll collectors to determine whether the status data indicates the abnormalities or not and whether the automatic toll payment task has been completed or not for determining whether the in-vehicle units are in abnormal conditions or not.

* * * * *